United States Patent

Reppert

[11] 4,266,436
[45] May 12, 1981

[54] TORQUE DIVISION GEARING

[75] Inventor: Rudi Reppert, Bochum, Fed. Rep. of Germany

[73] Assignee: WGW Westdeutsche Getriebe- und Kupplungswerke GmbH, Fed. Rep. of Germany

[21] Appl. No.: 40,729

[22] Filed: May 21, 1979

[30] Foreign Application Priority Data

Jun. 14, 1978 [DE] Fed. Rep. of Germany ....... 2826022

[51] Int. Cl.³ .......................... F16H 35/06; F16H 1/14
[52] U.S. Cl. ........................................ 74/395; 74/410; 74/417
[58] Field of Search ................. 74/395, 396, 400, 402, 74/410, 416, 417, 665 C, 665 GB

[56] References Cited

U.S. PATENT DOCUMENTS

| | | | |
|---|---|---|---|
| 1,040,443 | 10/1912 | Signor | 74/410 |
| 2,926,940 | 3/1960 | Maass . | |
| 3,368,420 | 2/1968 | Alexander | 74/410 |
| 3,374,687 | 3/1968 | Vogt | 74/417 |
| 3,616,708 | 11/1971 | Davis | 74/410 |
| 3,690,707 | 9/1972 | Van Rooij . | |
| 4,118,997 | 10/1978 | Woodward et al. | 74/417 |

FOREIGN PATENT DOCUMENTS 213421 9/1908 Fed. Rep. of Germany .
2544045 4/1977 Fed. Rep. of Germany .

*Primary Examiner*—Lawrence J. Staab
*Attorney, Agent, or Firm*—Hill, Van Santen, Steadman, Chiara & Simpson

[57] ABSTRACT

A torque division gearing system is disclosed wherein two pairs of bevel gears are provided with each pair having a large bevel gear and a small bevel gear. One of the small bevel gears is arranged on an input shaft and the other small bevel gear is mounted on a second shaft parallel to the input shaft. Each of the small bevel gears drive the respective two large bevel gears arranged on a common axially displaceable shaft. The displaceable shaft is coupled by a gear stage to an output shaft.

7 Claims, 1 Drawing Figure

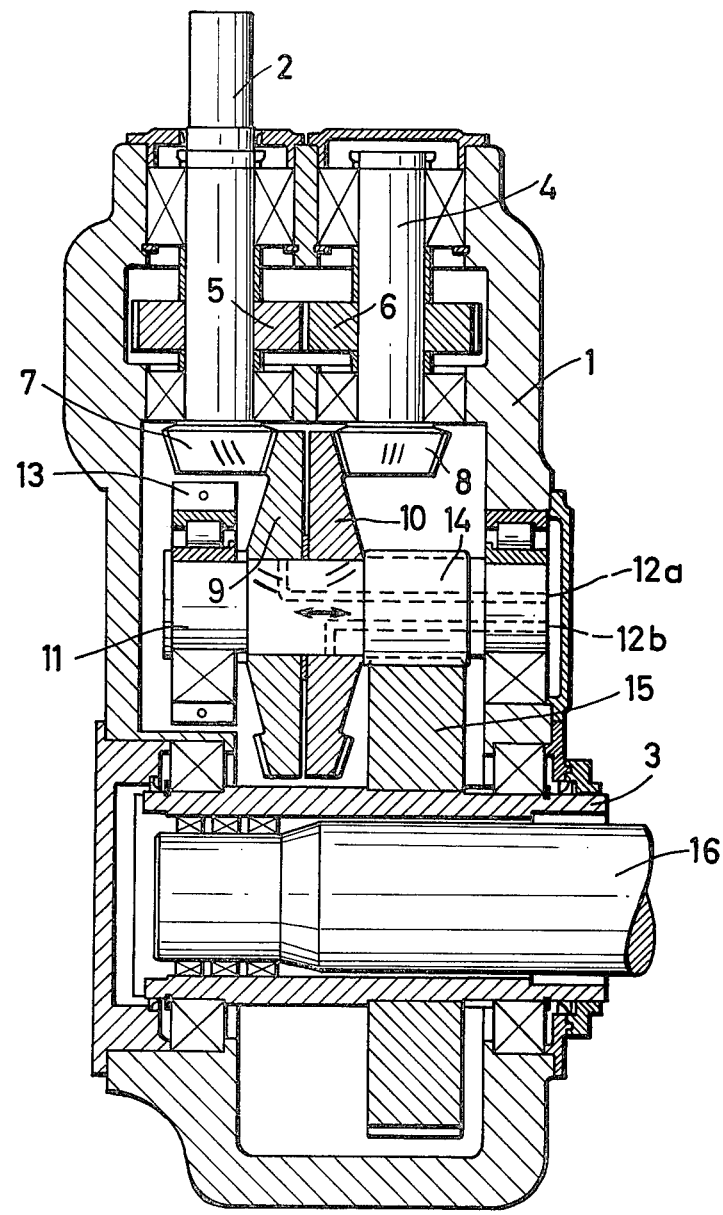

TORQUE DIVISION GEARING

BACKGROUND OF THE INVENTION

The invention concerns a torque division gearing designed as a bevel gear spur wheel gearing with a primary shaft and an output shaft as well as with two pairs of bevel wheels.

In driving conveyor belts, plate conveyors, travel gearing, etc., gears are required in which the motor is arranged in the longitudinal direction of the gear. The gearing itself should be constructed so as to be narrow and should be provided as slip-on gearing as well as stationary gearing. Suitable gearings are the known bevel spur wheel gearings. In the case of the bevel spur wheel gearings, however, limits are set with respect to the transferability of high outputs by means of a bevel wheel stage.

From the German OS No. 2,544,045.3, a bevel spur wheel gearing is already known in which for the increasing of transferable output, two pairs of bevel wheels are present, each of which takes up half of the output transferred. For a uniform distribution of output onto the two pairs of bevel wheels, this known gearing has an axially shiftable drive shaft.

SUMMARY OF THE INVENTION

The object of the invention is to improve a multiple output gearing of the previously mentioned kind, and, in particular, to provide an embodiment which is lighter and smaller, and in which the output distribution to the two bevel wheel stages occurs even more uniformly.

The object is achieved in that the two large bevel wheels of the bevel wheel pairs are arranged on a common axially displaceable shaft. By means of this arrangement the bevel wheels may be arranged directly adjacent one another and, further, the load distribution occurs directly in the bevel wheel stages. The load distribution is thus not influenced by different efficiency factors of gearing stages connected in series. Further, since the gearing output shaft is fixed axially, one can dispense with a coupling which equalizes the axial movement. There results a better, more uniform load distribution as well as an especially favorable and simple manner of construction for the gearing, so that the gearing can be made both smaller and also be, as a whole, more heavily loaded. Surprisingly, it has become apparent that bevel wheel stages can also be driven with variable tooth backlash without lowering the durability. The prerequisite for this is a precise manufacture of the gear wheels and an exact adjustment of the power branches so that the axial movements remain very slight.

For the design of the invention the small bevel wheel of the one pair of bevel wheels is arranged on the primary shaft and the small bevel wheel of the other pair of bevel wheels is arranged on a second shaft running parallel to the primary shaft, whereby the primary shaft and the parallel second shaft are connected with one another by a straight toothed spur wheel stage. In this manner, the gearing is developed in an especially simple manner and the prerequisite is established for the output distribution in the bevel wheel stage.

In a further development of the invention the bevel wheels are adjustably fastened opposite one another on the axially displaceable shaft, whereby the fastening of the bevel wheels occurs with a forced feed lubricator connection which can be operated externally. In this manner, the adjustment of the exact angle position and the mean backlash of the two power branches is especially simple and easy to accomplish. Tension devices which are difficult to move and which have very high friction need not be employed in order to attain the mutual fine adjustment. By means of this mounting of the bevel wheels according to the invention, the required exact adjustment of the two power branches to one another may occur especially quickly, so that the assembly costs for the gearing are also low.

In a further development of the invention the axially displaceable shaft is shorter than the width of the housing and the axially displaceable shaft is supported on the one side in the housing wall and on the other side in a bearing block. There results, therefore, a particularly favorable solution which permits the use of a simply designed housing and at the same time lessens the gearing weight.

In another development of the invention, the spiral directions of the bevel wheel tooth systems are arranged to function counter to one another. Therefore, the axial forces of the two bevel wheel stages are always directed against one another and no outward axial forces result. Therefore, especially small bearings can be used so that by means of this technique, to an extent previously unattained, a bevel spur wheel gearing results which is light and which can be highly loaded.

BRIEF DESCRIPTION OF THE DRAWING

The drawing illustrates in cross-section the gearing system of this invention.

DESCRIPTION OF THE PREFERRED EMBODIMENTS

In the drawing, 1 designates the gear housing, 2 the gearing primary shaft, and 3 the output shaft.

Parallel to the primary shaft 2 the branching shaft 4 is arranged which is connected with the primary shaft 2 via the spur wheels 5 and 6 which are advantageously straight-toothed and which are geared 1:1.

The primary shaft 2 is driven by a motor, not shown, preferably through the intermediary of a coupling. The drive output is then distributed between the primary shaft 2 and the branching shaft 4 and is transmitted to the large bevel wheels 9 and 10 via the bevel pinions 7 and 8 which are arranged upon the two shafts.

The large bevel wheels 9 and 10 are fastened on the axially displaceable shaft 11 with the help of oil press connections which are supplied with pressure oil by means of the bores 12a and 12b, which are indicated by broken lines. The axially movable shaft 11 is supported on the one side in the housing 1 and on the other side in the inner bearing block 13. In the case of smaller gearings, a conventional support in both sides of the housing can be advantageous. Next to the two bevel wheels 9 and 10 on the axially displaceable shaft 11, the pinion 14 is arranged, which meshes with the output wheel 15. In order to avoid axial thrusts, the pinion 14 and the output wheel 15 are provided in straight-toothed or double bevel-toothed fashion. The output wheel 15 is connected with the output shaft 3 which is provided advantageously as a hollow shaft. The hollow shaft is mounted on the shaft 16 of the driven apparatus.

The separation line of the gearing according to the invention is straight and the individual gearing branches can first be put in, and subsequently, with the help of oil press connections, can be simply and easily adjusted with respect to their angular position to one another. Therefore, a simple and easy inspection of the angular position and of the backlash during a 360° rotation is possible.

In all there results an especially light and small gearing, especially suited for the use of hardened gear wheels. In a manner not shown, it can be advantageous in the case of this gearing to cool the gearing oil separately in an oil cooler.

The gearing according to the invention is particularly suited for the driving of conveyor belts, plate conveyors, bucket chains, etc. However, it can also be used advantageously as a cutting head drive or the like for excavators.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A torque division gearing comprising: an input shaft having a first gear arranged at an intermediate position thereon, and also having a first bevel gear; a gear shaft parallel to the input shaft having a second gear driven via the first gear, and also having a second bevel gear; an axially freely displaceable shaft having mounting means for allowing free displacement in response to operational forces during operation of the gearing; third and fourth bevel gears on the displaceable shaft respectively mating with the first and second bevel gears, said freely displaceable shaft also having a third gear; an output shaft having a fourth gear arranged thereon driven by the third gear such that axial displacements of the displaceable shaft are isolated from the output shaft; and a controllable oil pressure connection means between at least one of the third and fourth bevel gears and the shaft allowing a controllable angle position adjustment of at least one of the bevel gears externally of the entire torque division gearing.

2. The gearing of claim 1 wherein the third gear is smaller than the fourth gear.

3. The gearing of claim 1 wherein said third and fourth gears have straight teeth permitting displacement of the displaceable shaft.

4. The gearing of claim 1 wherein the oil pressure connection also allows a spacing adjustment between the third and fourth bevel gears during operation externally of the entire torque division gearing.

5. A gearing according to claim 1 wherein the axially displaceable shaft is shorter than a width of a housing surrounding the gearing and is supported on one side in a wall of the housing wall and on the other side in an inner bearing block within the housing.

6. A gearing according to claim 1 wherein spiral directions of teeth of the bevel gear wheels of the first pair are arranged in operating opposition to spiral directions of teeth of the bevel gear wheels of the second pair.

7. A torque division gear comprising: an input shaft having a first gear arranged thereon and also having a first bevel gear; a gear shaft parallel to the input shaft having a second gear driven via the first gear and also having a second bevel gear; an axially freely displaceable shaft having mounting means for allowing free displacement in response to operational forces during operation of the gearing; third and fourth bevel gears on the displaceable shaft respectively mating with the first and second bevel gears, said freely displaceable shaft also having a third gear; an output shaft having a fourth gear arranged thereon driven by the third gear such that axial displacements of the displaceable shaft are isolated from the output shaft; and means for controllably adjusting the third and fourth bevel gears on the displaceable shaft to allow angle position adjustment of the third and fourth bevel gears externally of the entire torque division gearing.

* * * * *